(12) United States Patent
Lowe

(10) Patent No.: US 9,785,740 B2
(45) Date of Patent: Oct. 10, 2017

(54) COMPUTER IMPLEMENTED SYSTEM AND METHOD FOR MODIFYING A LAYOUT OF STANDARD CELLS DEFINING A CIRCUIT COMPONENT

(71) Applicant: ARM Limited, Cambridge (GB)

(72) Inventor: Ivan Michael Lowe, Sheffield (GB)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 14/975,482

(22) Filed: Dec. 18, 2015

(65) Prior Publication Data

US 2017/0177785 A1    Jun. 22, 2017

(51) Int. Cl.
*G06F 9/455* (2006.01)
*G06F 17/50* (2006.01)

(52) U.S. Cl.
CPC ...... *G06F 17/5081* (2013.01); *G06F 17/5045* (2013.01)

(58) Field of Classification Search
USPC .......................................... 716/133
See application file for complete search history.

(56) References Cited

U.S. PATENT DOCUMENTS

| 7,240,314 | B1* | 7/2007 | Leung | G06F 17/5068 257/773 |
| 8,516,404 | B1* | 8/2013 | Cao | G03F 1/70 716/50 |
| 2012/0096419 | A1* | 4/2012 | Mina | G06F 17/5068 716/106 |
| 2015/0318381 | A1* | 11/2015 | Tsai | H01L 29/66795 438/283 |

* cited by examiner

*Primary Examiner* — Eric Lee
(74) *Attorney, Agent, or Firm* — Pramudji Law Group PLLC; Ari Pramudji

(57) ABSTRACT

A computer implemented system and method is provided for modifying a layout of one or more standard cells defining a circuit component, the layout providing a layout pattern for a process technology. The method comprises receiving, after completion of one or more initial place and route operations, an input data file that includes the layout pattern of the layout. The layout includes the one or more standard cells and placement and routing information generated by the one or more initial place and route operations. The method further comprises identifying one or more metal portions associated with one or more rails of the one or more standard cells of the layout. A metal fill operation is then performed using the input data file in order to generate a modified input data file. The metal fill operation includes modifying the one or more metal portions with one or more metal fill patterns to form a reduced resistive path associated with the one or more metal portions.

19 Claims, 5 Drawing Sheets

COMPUTER IMPLEMENTED SYSTEM AND METHOD FOR MODIFYING A LAYOUT OF STANDARD CELLS DEFINING A CIRCUIT COMPONENT

TECHNICAL FIELD

The present technique relates to a computer implemented system and method for modifying a layout of one or more standard cells defining a circuit component.

BACKGROUND

When producing integrated circuits, a number of process layers are formed on a substrate, each process layer incorporating a layout pattern. The layout patterns within the various layers establish component features and interconnections such that once the final process layer is formed, an integrated circuit containing all of the required circuit components interconnected in the manner required to perform the functions of the integrated circuit is produced.

For a new integrated circuit (IC), a layout of that integrated circuit will be produced in the form of a data file identifying the required layout patterns for each of the process layers. To assist in the generation of such a layout, it is known to use cell libraries providing a plurality of different cells, each cell defining a layout for a particular component. Various types of cells are used in modern systems for generating integrated circuit layouts, for example standard cells, datapath cells, custom cells, cells representing portions of a memory device, etc. For purposes of the following discussions, the standard cell example will be referred to herein.

A standard cell library will provide a plurality of standard cells, each standard cell defining a layout for a particular circuit component. The circuit components for which standard cells are developed are typically the basic building block components (e.g., AND gates, NAND gates, OR gates, NOR gates, inverters, flops, etc.) used to construct more complex circuits within the integrated circuit.

Once a standard cell library has been produced for a particular process technology, the design of integrated circuits for that process technology can be simplified. For example, it is known to provide automated tools which use a functional design of a planned integrated circuit (for example in the form of a gate level net list or a Register Transfer Language (RTL) higher level representation of the design) and a standard cell library in order to generate the layout of the planned integrated circuit.

Typically, the standard cells are arranged in rows by the automated tool. Considering the rows run horizontally, the left and right boundaries of each standard cell may be placed next to any other given standard cell. Thus the automated tool has free choice as to which standard cells are placed where in order to fulfil the requirements of the functional design with a low routing overhead and to ensure the most efficient use of area taken up by cell placement.

In addition to the circuit components the standard cell defines, each standard cell may contain one or more rails to which circuit component elements of the standard cell are connected. The rails may provide fixed potentials to the circuit component elements of the standard cell. For example, each standard cell may have a high potential rail, such as a power rail (e.g., a Vdd rail), and a lower potential rail, such as a ground rail (e.g., a GND rail or a Vss rail). Upon creation of the standard cell library, components within each standard cell (e.g., circuit component elements, rails, etc.) may be fixed and difficult to modify.

Standard cell libraries with the plurality of standard cells may be created for a particular process technology. The standard cells may exhibit the physical, electrical, and performance characteristics associated with the particular process technology. As an example, for current process technologies (e.g., up to and including 20 nm technology), the standard cells may have corresponding geometries, and the metal layers used for cell rails may exhibit a corresponding resistivity. As process technologies reduce below the 20 nm technology (e.g., approaching 16 nm-14 nm domain), the techniques used to develop each of the process layers of the standard cells become significantly more complex. For example, at each process layer, the number of processes required to perform the required layout patterns increases, as techniques, such as double patterning technique (DPT), may be required to produce the layout pattern at such small process geometries. Additionally, changes in resistivity associated with the metal layers used for the standard cell rails may correspond to the smaller process geometry.

For process technologies having small process geometries (e.g., those in the 16-14 nm domain and smaller), standard cell rails may utilize a low metal layer (e.g., s metal 2 (M2) layer or metal 3 (M3) layer). The low metal layer(s) may be produced using a DPT process or may be produced using conventional lithographic techniques. The small geometry of the low metal layer coupled with its process characteristics may result in a very high resistivity for the low metal layer (e.g., M2 or M3 metal layer) and the standard cell rails that utilize it. Standard cell rails (e.g., power and ground rails), when inserted by a user of the cell library, cannot be drawn any wider because pins in some of the standard cells will no longer be accessible to the user without causing metal shorts or introducing spacing design rule check (DRC) violations.

Accordingly, standard cell rails using high resistivity metal layers which cannot be readily widened may present a user with difficulty in satisfying one or more performance requirements of an integrated circuit ("IC") design. For example, for an IC layout design utilizing power switch standard cells, the use of standard cell rails with the low metal layer may make satisfying one or more maximum dynamic (i.e., instantaneous) voltage drop requirements (e.g., less voltage drop as possible) difficult. Placement of the power switch standard cells more closely together may lower the resistivity and corresponding voltage drop but at a cost of disturbing layout efficiency. For example, such a placement of standard cells may disturb the efficiency of area usage of the layout and may result in an undesired increase in total cell area that is used.

The use of larger standard cells with wider rails to address performance requirement issues may also present an undesired larger standard cell footprint. The larger standard cell footprint may result in increased total cell area and an undesired increase in cost. The above described problems are magnified when numerous modifications of a layout, such as a layout of a system on a chip (SoC), are to be performed to meet particular performance requirements.

BRIEF DESCRIPTION OF THE DRAWINGS

The present technique(s) will be described further, by way of example only, with reference to embodiments thereof as illustrated in the accompanying drawings, in which.

DETAILED DESCRIPTION

Figure 1:
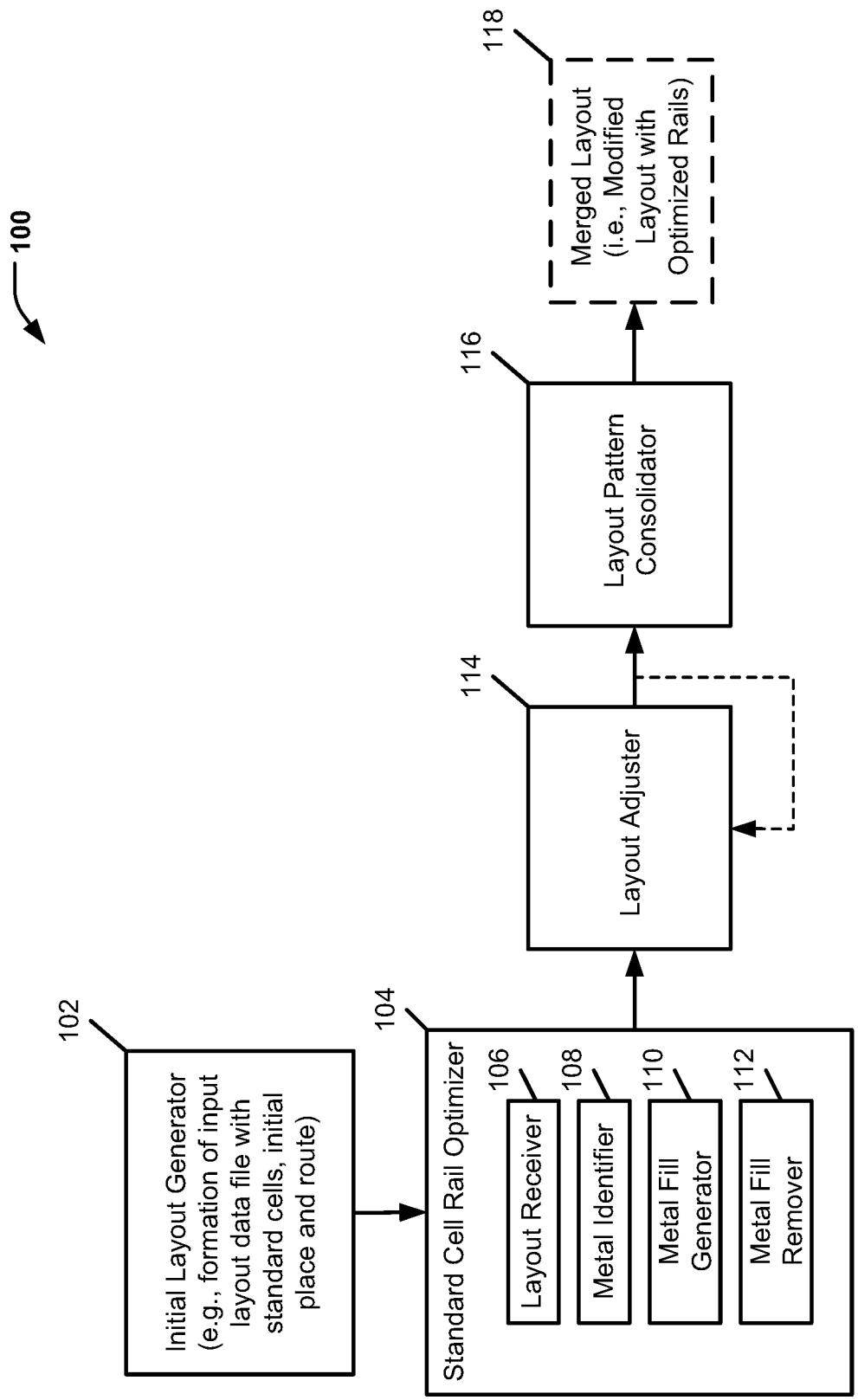
FIG. 1 is a block diagram schematically illustrating a system in accordance with one embodiment.

Before discussing the embodiments with reference to the accompanying figures, a brief description of various embodiments is provided. In one embodiment, a computer implemented method for modifying a layout of one or more standard cells defining a circuit component is described herein. The layout provides a layout pattern for a process technology. The method includes receiving, after completion of one or more initial place and route operations, an input data file that includes the layout pattern of the layout. The layout includes the one or more standard cells and placement and routing information generated by the one or more initial place and route operations. The method further includes identifying one or more metal portions associated with one or more rails of the one or more standard cells of the layout; and performing a metal fill operation on the input data file in order to generate a modified input data file. The metal fill operation includes modifying the one or more metal portions with one or more metal fill patterns to form a reduced resistive path associated with the one or more metal portions.

In another embodiment, there is provided a computer program product on a non-transitory storage medium for controlling a computer to perform the above-described method of modifying a layout of one or more standard cells defining a circuit component In another embodiment, there is provided a system for modifying a layout of one or more standard cells defining a circuit component, the layout providing a layout pattern for a process technology, the system comprising: means for receiving, after completion of one or more initial place and route operations, an input data file that includes the layout pattern of the layout, where the layout includes the one or more standard cells and placement and routing information generated by the one or more initial place and route operations; means for identifying one or more metal portions associated with one or more rails of the one or more standard cells of the layout; and means for performing a metal fill operation on the input data file in order to generate a modified input data file, where the metal fill operation includes modifying the one or more metal portions with one or more metal fill patterns to form a reduced resistive path associated with the one or more metal portions In a further embodiment, there is provided a method of manufacturing an integrated circuit comprising: employing the above-described standard cell layout modification method to generate layouts of a plurality of standard cells, each standard cell defining a circuit component; generating, from an input functional definition of the integrated circuit, a layout design incorporating the modified layouts of the plurality of standard cells; and manufacturing the integrated circuit from the layout design.

In one embodiment, the method of modifying the layout of one or more standard cells and their associated rails is provided so as to address performance characteristics (e.g., minimizing dynamic and/or static voltage drops, increasing rail switching speed) of an IC based on initial placement, routing, and optimizations of the IC layout design. The method may be automated to enable efficient layout modification of standard cell rails while reducing the time used for such modification of standard cells associated with an IC layout (e.g., layouts of individual component circuits, larger device circuits, and/or whole system on a chip (SoC)).

The method may be process independent such that it may be applied to various process technologies. For example, the method may be applied to process technologies having small process geometries (e.g., those in the 16-14 nm domain and/or smaller geometries). The method may be applied to process technologies that utilize various lithographic techniques (e.g., double patterning technique (DPT). The method may be applied to process technologies that implement planar devices, multi-gate devices (e.g., FinFET devices), or a combination of both.

Standard cells may undergo a series of place and route (PR) operations. After these initial PR operations, it may be determined that the layout design does not satisfy one or more performance requirements. For example, performance requirements (e.g., one or more maximum dynamic and/or static voltage drop requirements) associated with rails of the standard cells may not be satisfied by the layout design. After initial PR operations, modifications to the layout design to enable satisfying the one or more performance requirements may be difficult, may be cost prohibitive, or may be unavailable to a user.

As an example, standard cells of a small process technology may be used for a layout of a SoC integrated circuit. The process technology may provide different sized standard cells that accommodate different routing tracks. For example, a small process technology, such as a 16-14 nm technology, may provide standard cells sized for 7.5 tracks (7.5T) with rails of a certain width and may provide larger sized standard cells sized for 9 tracks (9T) with wider rails. A layout using 9T standard cells with the wider rails may satisfy the performance requirement (e.g., maximum dynamic and/or static voltage drop requirement) but with a corresponding use of area that is cost prohibitive. A layout using smaller sized 7.5T standard cells with rails of less width (compared to 9T rails) may use area that is not cost prohibitive but does not satisfy the performance requirement. Attempts to change the components within the 7.5T standard cell may be prohibitive as well. For example, once the standard cells have been inserted into the layout by a user, the rails of 7.5T standard cells cannot be drawn any wider because pins in some of the 7.5T standard cells will no longer be accessible to the user without causing metal shorts or introducing DRC violations.

The method described herein for modifying the layout of one or more standard cells and their associated rails after the standard cells have undergone initial PR operations may provide reduced resistive paths associated with standard cell rails to enable the layout to satisfy performance requirements, such as maximum dynamic and/or static voltage drop requirements associated with the rails. For example, a layout that includes one or more standard cells and associated rails may undergo initial PR operations. Subsequently, metal portions associated with rails of the standard cells of the layout may be identified. The metal portions may be of a low metal layer. Then, metal fill operations may be performed on the layout to modify the metal portions with overlaid metal fill patterns (e.g., patterns comprised of low metal layers such as M2 or M3 metal layers). Such modifications to the layout enable the formation of reduced resistive paths associated the rails of the standard cells. For example, the rail path having the added overlaid metal fill pattern may have a larger width and a corresponding lower resistivity as compared to the rail path without the added overlaid metal fill pattern.

Such modifications to the layout by the method above and further described herein, may enable the use of small sized standard cells with metal rails of high resistivity to meet maximum dynamic and/or static voltage drop requirements as well as other performance requirements for an IC design. The method may provide reduced resistive paths associated with standard cell rails for various sizes of standard cells (e.g., sizes corresponding to 9T, 7.5T, or other smaller sized cells) of both a current process technology and other future smaller process technologies. The method may be applied to various types of standard cells with associated rails, such as power switch standard cells, datapath standard cells, standard cells representing portions of a memory device, processing device cells, control device cells, or other discrete IC devices.

In a non-limiting example, the method may be applied to a layout design having a power switching domain that uses power switch standard cells. The power switch standard cells may utilize low metal layer portions (e.g., M2 or M3 portions) to interconnect between one or more power switch standard cells. The high resistivity of the low metal layer interconnect coupled with the resistivity of the one or more power switch cells may generate a high resistive path through the power switch standard cells and other associated standard cells and their rails. The layout design having power switch standard cells may undergo initial PR operations. Metal portions (e.g., M2 interconnect or metal "straps") associated with the power switch standard cells may be identified and metal fill operations may be performed on the layout to modify the metal portions with overlaid metal fill patterns. Such modifications to the layout enable the formation of reduced resistive paths associated with the power switch standard cells and other associated standard cells and their rails.

Such modifications to the layout by the method above and further described herein, may enable the formation of reduced resistive paths between a top layer power supply and the power switches, between one or more power switches, or between power switches and other standard cells. Such modifications to the layout by the method may mitigate any undesired effects of IR voltage drops along a path and enable the layout design to satisfy one or more performance requirements for the corresponding IC design. It is to be understood that the method above and further described herein, is not limited to the modification of power switched standard cells of a particular technology but whose modifications may also be applied to other types of standard cells of other process technologies.

By the method above and further described herein, it will be understood that such an approach enables an automated mechanism for modifying metal portions associated with rails of standard cells in order to enable the formation of reduced resistive paths associated with the rails. This technique may reduce the degree of voltage drop along a rail path and enable the layout design to satisfy one or more performance requirements of a corresponding IC design. Further, the iterative and automated application of the method improves the productivity and reduces the time required to make changes to an existing layout, or to migrate from one process technology to another. This in turn allows for additional iterations and improvements, thus improving the overall quality of the design at less cost.

Particular embodiments will now be described with reference to the figures.

For the purpose of describing the following embodiments, the modification of standard cells will be considered, but the same techniques can also be applied to the modification of other types of cells that may contain rails.

Referring to FIG. 1, a block diagram schematically illustrating a system in accordance with one embodiment is shown and generally designated 100. The system 100 includes a standard cell rail optimizer 104. The standard cell rail optimizer 104 may modify a layout of standard cells to change metal portions associated with rails of the standard cells. Changes to the standard cell rails may optimize the rails to enable the formation of reduced resistive paths associated with the standard cell rails.

The standard cell rail optimizer 104 includes a layout receiver 106, a metal identifier 108, a metal fill generator 110, and a metal fill remover 112. The layout receiver 106 is configured to receive an input layout data file that provides a layout pattern for a particular layout. The input layout data file includes one or more standard cells, initial place and route information, and other information associated with the standard cells. The input layout data file may be generated by an initial layout generator 102. In a particular embodiment, the input layout data file may be the result of a combination of tools. For example, a layout tool may form a standard cell layout which may then be further processed by one or more other tools, such as a separate place and route tool, to produce the input layout data file.

The metal identifier 108 may process the input layout data file to identify one or more metal portions associated with the standard cells of the layout. For example, the metal identifier 108 may scan the input layout data file to identify metal portions of each standard cell of the layout presented in the input layout data file. In another embodiment, the metal identifier 108 may use other data files (e.g., schematic files, RTL file, netlist files, etc.) that correspond to the layout data file to identify metal portions. The other data files may be used by the metal identifier 108 individually or in combination with the input layout data file. The metal portions identified may be rail portions of the standard cells, strap portions associated with the rails of the standard cells, or a combination of both rail portions and strap portions. The strap portions may be horizontal straps or vertical straps that may be associated with standard cell rails, power switches, or other cells within a process layer or between process layers. The vertical strap portions may be low metal layer (e.g., an M3 metal layer) that vertically interconnect one or more layout areas (e.g., standard cell rails, power switches, or other cells) together.

The metal fill generator 110 may further process the input layout data file based on the identification of metal portions provided by the metal identifier 108. For example, one or more metal fill operations by the metal fill generator 110 may be performed on the input layout data file. Based on the identified metal portions, the metal fill operation may include the overlaying of one or more metal fill patterns onto one or more of the identified metal portions associated with the standard cells of the layout presented in the input layout data file. It is to be understood that the one or more metal fill operations are performed after one or more initial placement and optimization operations of standard cells in the layout and after one or more initial routing (e.g., metal and/or polysilicon routing) operations of the layout. The added metal fill patterns may comprise a low metal layer of the process technology (e.g., a metal 2 (M2) layer or metal 3 (M3) layer). The added metal fill patterns may be the same metal layer as the identified metal portions. In a particular embodiment, the added metal fill patterns may comprise substantial metal portions (e.g., portions larger than small optical proximity correction (OPC) fragments) that have undergone OPC processes.

The metal fill remover 112 may further process the input layout data file based on the added metal fill patterns provided by the metal fill generator 110. For example, for each metal fill pattern overlaid onto the identified metal portions, the metal fill remover 112 may determine whether the added metal fill pattern(s) satisfies one or more conditions associated with the process technology. For example, a condition may be to satisfy one or more pin access requirements. Another or additional condition may be to satisfy one or more design rule check (DRC) requirements. To illustrate, for a DRC condition associated with process technology, the metal fill generator 110 may determine if the added metal fill pattern(s) satisfies one or more DRC's. If the added metal fill pattern(s) does not satisfy the one or more DRC's (i.e., the added metal fill pattern(s) is not DCR "clean"), the metal fill pattern(s) may be determined to not satisfy the DCR condition. In this case, the metal fill remover 112 may remove the added metal fill pattern(s) from the identified metal portion associated with the standard cells of the input layout data file.

In the case of a pin access condition, for example, an added metal fill pattern may satisfy a DRC condition (i.e., is DRC clean) with respect to an adjacent pin. However, if subsequent access to the adjacent pin (e.g., via a subsequent routing operation) is not possible without incurring a DRC violation, the pin access condition may not be satisfied. In this case, the metal fill remover 112 may remove the added metal fill pattern adjacent to the pin. In this manner, only added metal fill patterns that are DRC clean and/or satisfy other conditions of the process technology will remain in the layout presented in the input layout data file.

Processing of the input layout data file by the standard cell rail optimizer 104 modifies the layout presented in the input layout data file and generates a modified input layout data file that may undergo further processing by components of the system 100. It is to be understood that the components of the standard cell rail optimizer 104 (e.g., the layout receiver 106, the metal identifier 108, the metal fill generator 110, and the metal fill remover 112) may be implemented as software modules, hardware modules or a combination of both software and hardware modules.

The system 100 further includes a layout adjuster 114 that may process the modified input layout data file generated by the standard cell rail optimizer 104. For example, the layout provided by the modified input layout data file may undergo one or more layout adjustments by the layout adjuster 114. The layout adjustments may include one or more engineering change order (ECO) iterations and/or one or more place and route iterations. The layout adjustments may implement changes in the layers of the layout to address errors (e.g., placement errors, routing errors, performance errors, etc.) associated with the layout of the modified input layout data file. In a particular embodiment, the layout adjustments may include one or more pattern correction iterations to correct pattern errors in the layers of the layout. In this case, the layout adjuster may coordinate with a separate pattern correction tool to implement the patterns corrections. Alternatively, the layout adjuster 114 may itself perform the patterns corrections. The layout adjustments made to the layout of the modified input layout data file may be implemented in any order and may occur either sequentially or in parallel. Processing of the modified input layout data file by the layout adjuster 114 adjusts the layout presented in the modified input layout data file and generates an output layout data file that may undergo further processing. For example, the output layout data file may undergo one or more other ECO/place and route iterations and one or more other pattern correction iterations (as illustrated by the dashed line associated with the layout adjuster 114). In another embodiment, the output layout data file may undergo further processing by a layout pattern consolidator 116.

The system 100 further includes a layout pattern consolidator 116 that may process the output layout data file generated as a result of one or more layout adjustments. For example, the layout provided by the output layout data file may undergo one or more merge operations by the layout pattern consolidator 116. The merge operations may include merging the metal fill patterns (e.g., the metal fill patterns added to the metal portions of the standard cells) into drawn metal. The merge operations applied to the output layout data file results in formation of a merged layout 118 with drawn metal. The merged layout 118 includes the metal fill patterns for standard cell rail optimization, ECO/place and route changes, pattern correction change information, and pattern merge information.

The system 100 may enable layout modification of standard cell rails that have undergone initial PR operations to result in the formation of reduced resistive paths associated with standard cell rails. The resulting reduced resistive rail paths may reduce the dynamic and/or static voltage drops associated with the rails of one or more standard cells of a layout and may enable satisfying one or more performance requirements of an IC design. The system 100 and its components (e.g., 102-116) maybe implemented using individual hardware modules, individual software modules, or a combination of both hardware and software modules.

Figure 2:
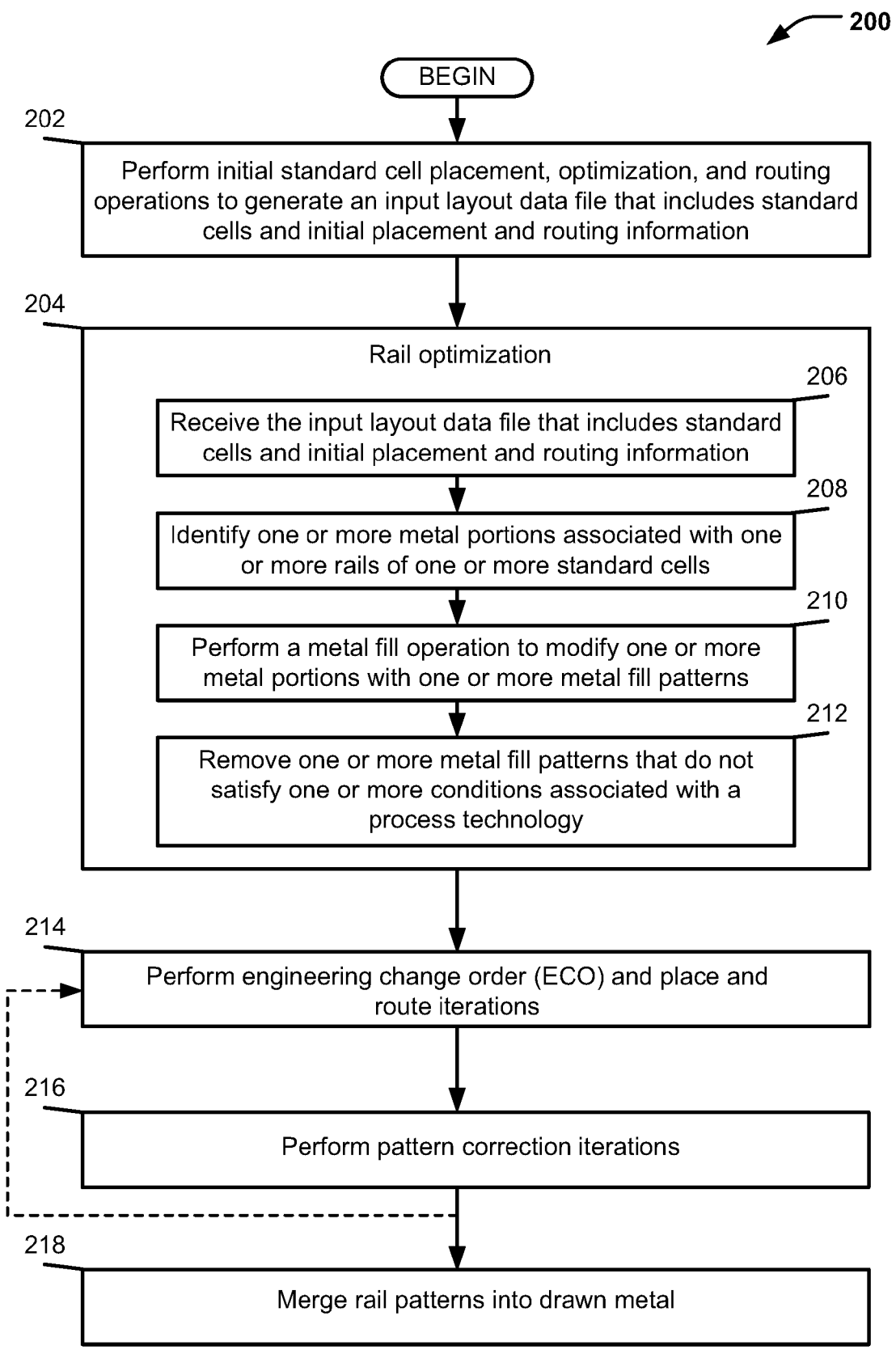
FIG. 2 is a flow chart that illustrates a particular embodiment of a method of modifying a layout of one or more standard cells defining a circuit component.

Referring to FIG. 2, a flow chart that illustrates a particular embodiment of a method of modifying a layout of one or more standard cells defining a circuit component is shown and generally designated 200. The method 200 may be performed by the system 100 of FIG. 1. The method 200 may include performing initial standard cell placement, optimization, and routing operations to generate an input layout data file that includes standard cells and initial placement and routing information at 202. For example, standard cells from a standard cell library may be used to form an input layout data file. The standard cells may undergo one or more initial placement and routing operations by a cell placement and routing tool. The standard cells may also undergo one or more optimization operations to further adjust connectivity and or arrangement of standard cells. The initial placement, routing and optimization of the standard cells may result in an input layout data file having the standard cells with the initial placement, routing, and optimization information.

The method 200 also includes rail optimization of standard cell rails at 204. For example, metal portions associated with one or more rails of one or more standard cells of a layout may be modified to form reduced resistive paths associated with the metal portions. In a particular embodiment, the metal portions may be rail portions of the standard cells. In another embodiment, the metal portions may be strap portions associated with the standard cells or may be a combination of rail portions and strap portions. The rail optimization of the standard cells may be performed by the standard cell rail optimizer 104 of FIG. 1.

As part of the rail optimization of standard cell rails at 204, the method 200 also includes receiving the input layout data file that includes standard cells and initial placement and routing information, at 206. For example, an input layout data file that provides a layout pattern having the standard cells with the initial placement, routing, and optimization information may be received as part of the rail optimization of standard cells. In a particular embodiment, the receiving of the input layout data file may be received by the layout receiver 106 of the standard cell rail optimizer 104 of FIG. 1.

As part of the rail optimization of standard cell rails at 204, the method 200 also includes identifying one or more metal portions associated with one or more rails of one or more standard cells, at 208. For example, the received input layout data file having the standard cells with the initial placement, routing, and optimization information may be processed in a manner that enables identification of metal portions associated with the one or more standard cells. The metal portions may be standard cell rail portions. In a particular embodiment, the identified metal portions may be strap portions associated with the standard cells of the input layout data file. The identification of metal portions may be based upon layout pattern information of the input layout data file and/or the initial placement, routing, and optimization information. In other embodiments, metal portion identification may be based upon other information that corresponds to or is associated with the input layout data file, such as but not limited to schematic information, register-transfer level (RTL) information, other hardware description language (HDL) information, netlist information, the application of DRC information of a process technology, or other circuit identifier information. In a particular embodiment, the identifying of one or more metal portions may be performed by the metal identifier 108 of the standard cell rail optimizer 104 of FIG. 1.

As part of the rail optimization of standard cell rails at 204, the method 200 also includes performing a metal fill operation to modify one or more metal portions with one or more metal fill patterns, at 210. For example, one or more metal fill operations may be performed on the input layout data file. In this case, one or more metal fill patterns may be overlaid onto one or more identified metal portions associated with the standard cells of the input layout data file. The added metal fill patterns may substantially overlap the one or more metal portions. In a particular embodiment, the metal portions may be rail portions, such that added metal fill patterns may substantially overlap the width and length of one or more rail portions of one or more of the standard cells. In another embodiment, the metal fill patterns may comprise a low metal layer (e.g., M2 or M3 metal layers) and may have a width (e.g., thickness) that is larger than a minimum width of the low metal layer (e.g., a minimum width of M2 or M3) of the process technology.

In another embodiment, the metal fill patterns may comprise metal that has undergone an OPC process. The metal fill operation that includes the adding of metal fill patterns to metal portions of the one or more standard cells may generate a modified input layout data file that may be used in subsequent processing operations. The metal fill operation that includes adding of the metal fill patterns to metal portions of the one or more standard cells may be done in an automated manner either incrementally (e.g., one at a time) or all at once. In a particular embodiment, the metal fill operation may be performed by the metal fill generator 110 of the standard cell rail optimizer 104 of FIG. 1.

As part of the rail optimization of standard cell rails at 204, the method 200 also includes removing one or more metal fill patterns that do not satisfy one or more conditions associated with a process technology at 212. For example, the modified input layout data file generated at 210 may be used such that each metal fill pattern overlaid onto metal portions may undergo a determination as to whether the metal fill pattern satisfies one or more conditions associated with a process technology. In a particular embodiment, the condition may be to satisfy one or more design rule checks (DRC's). In this case, an added metal fill pattern that does not satisfy one or more DRC's (i.e., the added metal fill pattern is not DCR "clean") may be determined to not satisfy the DCR condition and the added metal fill pattern may be removed from the metal portion associated with the standard cells of the input layout data file. In another embodiment, the condition may be to satisfy one or more pin access requirements. In this case, an added metal fill pattern that prevents or hinders access to one or more pins may be determined to not satisfy the pin access condition and the added metal fill pattern may be removed from the metal portion associated with the standard cells of the input layout data file. Other conditions associated with metal fill pattern removal may be contemplated, such as connectivity conditions (e.g., standard cell access, rail access, etc.) or performance conditions (e.g., timing, power consumption, switching speed, etc.). The modified input layout data file may include the metal fill patterns added during the metal fill operation at 210 and may not include the metal fill patterns removed at 212. In a particular embodiment, the removal of the one or more metal fill patterns may be performed by the metal fill remover 112 of the standard cell rail optimizer 104 of FIG. 1. Subsequent to the rail optimization 204, the modified input layout data file may be used in further processing operations.

The method 200 may also include performing one or more engineering change order (ECO) iterations and/or one or more place and route iterations at 214. For example, the modified input layout data file having metal fill patterns for standard cell rail optimization may undergo one or more ECO's to implement changes in layers of the layout. Such ECO's may include but not limited to routing ECO's, placement ECO's, layer ECO's (e.g., metal-mask, other layer post-mask ECO's) and other design engineering change orders. The modified input layout data file having metal fill patterns may also undergo one or more place and route operations to implement placement and routing changes of the layout. The ECO changes and the place and route changes made to the modified input layout data file result in the formation of an intermediate layout data file that includes the modified input layout data file with the ECO and place and route changes. In some embodiments, the use of metal fill patterns comprised of metal that has undergone an OPC process may optimize the ECO and place and route iterations by providing metal fill patterns that indicate satisfying a DRC requirement. In a particular embodiment, the ECO and place and route iterations 214 may be performed by the layout adjuster 114 of FIG. 1. Subsequent to ECO and place and route iterations 214, the modified input layout data file may be used in further processing operations.

The method 200 may also include performing one or more pattern correction iterations at 216. For example, the intermediate layout data file having metal fill patterns for standard cell rail optimization and ECO/place and route changes may undergo one or more pattern corrections to correct pattern errors in the layers of the layout. The patterns corrections may include optical proximity corrections (OPC's) to correct differences in layout features (e.g., linewidth differences, line shortening, unwanted layer overlaps, etc.). The patterns corrections may further include removal of OPC's that do not satisfy a condition associated with the process technology. For example, the removal of OPC's that are not DRC "clean." The pattern corrections made to the intermediate layout data file result in the formation of an output layout data file that includes the intermediate layout data file with the pattern correction changes. In a particular embodiment, the pattern correction iterations 216 may be performed by the layout adjuster 114 of FIG. 1. Subsequent to pattern correction iterations 216, the output layout data file may be used in further processing operations. For example, the output layout data file may undergo one or more other ECO/place and route iterations 214 and one or more other pattern correction iterations 214 (as illustrated by the dashed line from 216 to 214). In a particular embodiment, the output layout data file may be used as part of a subsequent merge operation, as described with reference to step 218 of FIG. 2.

The method 200 may also include merging rail patterns into drawn metal at 218. For example, the output layout data file having metal fill patterns for standard cell rail optimization, ECO/place and route changes, and pattern correction change information may undergo one or more merge operations to form a merged layout that includes drawn metal. As part of the merge operation, the standard cell rail portions optimized with metal fill patterns may be merged into drawn metal. The drawn metal of the merged layout may be logically connected to one or more power networks of a semiconductor chip associated with the merged layout. The resulting merged layout may have the metal fill patterns for standard cell rail optimization, ECO/place and route changes, pattern correction change information, and pattern merge information. In a particular embodiment, the merging of rail patterns in to drawn metal 218 may be performed by the layout pattern consolidator 116 of FIG. 1.

The method 200 may enable layout modification of standard cell rails to result in the formation of reduced resistive paths associated with standard cell rails. The resulting reduced resistive rail paths may reduce the dynamic and/or static voltage drops associated with the rails of one or more standard cells of a layout to satisfy one or more performance requirements of an IC design.

Whilst steps 202-218 of the method 200 are shown as being performed sequentially, it will be appreciated that two or more of these steps could be performed in a different order or in parallel. For example, the steps associated with the rail optimization 204 are described as occurring after one or more placement, routing, and optimization operations have been performed on the standard cells of the input layout data file. Alternatively or in addition to, rail optimization 204 may also be performed at other points in the method 200, such as after the ECO and place and route iterations 214 or after one or more pattern correction iterations at 216.

Figure 3:
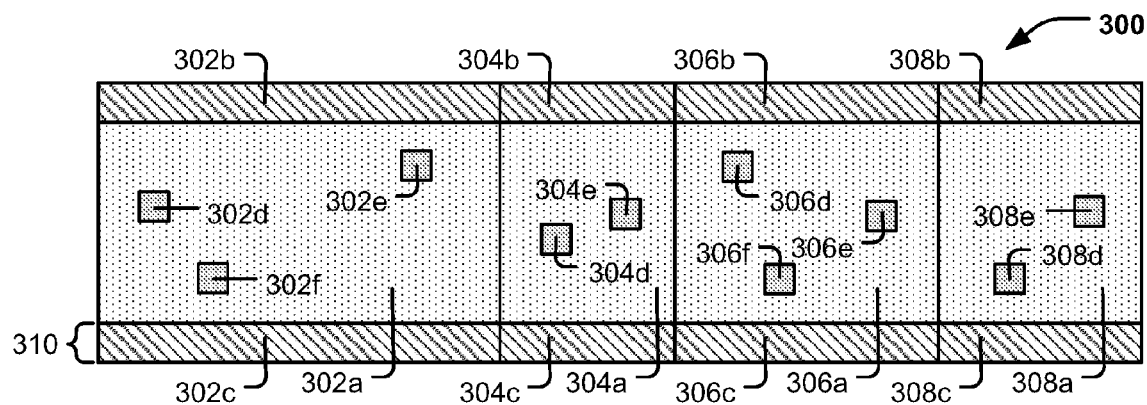
FIG. 3 illustrates an exemplary layout design prior to modification using a method in accordance with one embodiment.

Referring to FIG. 3, an exemplary layout design prior to modification using the earlier described techniques is shown and generally designated 300. The layout design 300 may include a plurality of standard cells 302*a*, 304*a*, 306*a*, and 308*a*. Each standard cell of the plurality of standard cells 302*a*, 304*a*, 306*a*, and 308*a* may include various diffusion regions and/or polysilicon regions (not shown) for defining circuit components. Each standard cell of the plurality of standard cells 302*a*, 304*a*, 306*a*, and 308*a* may be associated with access pins (e.g., access pins 302*d-f*, 304*d-e*, 306*d-f*, and 308*d-e*) and rail portions (e.g., rail portions 302*b-c*, 304 *b-c*, 306 *b-c*, and 308 *b-c*). For example, standard cell 302*a* may be associated with access pins 302*d-f* and rail portions 302*b* and 302*c*. Standard cell rail portions 302*b*, 304*b*, 306*b*, and 308*b* may be portions of a power rail (e.g., a Vdd rail) while standard cell rail portions 302*c*, 304*c*, 306*c*, and 308*c* may be portions of a ground rail (e.g., a GND rail or Vss rail). Each standard cell of the plurality of standard cells 302*a*, 304*a*, 306*a*, and 308*a* may be placed adjacent to another standard cell in a manner to allow continuous electrical connections between each of the plurality of standard cells. The placement of each standard cell of the plurality of standard cells may be the result of one or more initial place and route operations (e.g., operations associated with step 202 of FIG. 2) associated with a process technology. The layout design 300 may include additional place and route information (not shown) as a result of the one or more initial place and route operations performed on the layout design 300.

Standard cell rail portions (e.g., rail portions 302*b-c*, 304 *b-c*, 306 *b-c*, and 308 *b-c*) of the layout design 300 may have a minimum width 310 (e.g., thickness) that is associated with a minimum width of a low metal layer of a process technology. For example, the minimum width 310 may be a minimum width of a metal-2 (M2) layer of the process technology. In a particular embodiment, the minimum width may be associated with a 16-14 nm process technology. The standard cell rail portions may be implemented using other metal layers (e.g., other low metal layers of the process technology) having a high resistivity characteristic. Rail optimization of the standard cell rail portions of the layout design 300 may occur by use of the earlier described techniques. For example, standard cells of a process technology may be used with one or more initial place and route operations to generate the layout design 300. The layout design 300 may have placement/routing information and standard cells with rails of minimum width 310 and a corresponding high resistivity characteristic. The layout design 300 may then be modified using the earlier described techniques to optimize the standard cell rail portions. Modification of the layout design 300 may include the insertion into the layout design 300 of one or more metal fill patterns having a width that is greater than the minimum width 310.

The inserted metal fill patterns may be placed to substantially overlap standard cell rail portions identified in the layout design 300. In one embodiment, the inserted metal fill patterns may be placed to substantially overlap metal straps associated with rail portions of the standard cell identified in the layout design 300. Removal of placed metal fill patterns that do not satisfy one or more conditions of the process technology may occur subsequent to or concurrently with the placement of the metal fill patterns. Modification of the layout design 300 in this manner using the earlier described techniques may result in a modified layout design with optimized standard cell rails as further described in FIG. 4.

Figure 4:
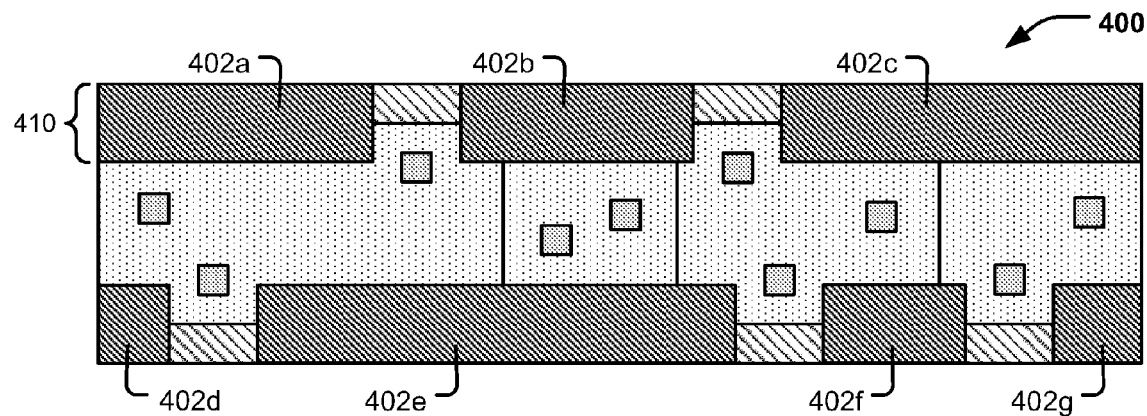
FIG. 4 illustrates an exemplary modified layout design in accordance with a particular embodiment of a method of modifying a layout of one or more standard cells defining a circuit component.

Referring to FIG. 4, an exemplary modified layout design that illustrates a particular embodiment of a method of modifying a layout of one or more standard cells defining a circuit component is shown and generally designated 400. The modified layout design 400 may be the result of modification to a layout design (e.g., the layout design 300 of FIG. 3) using the earlier described techniques. The layout design (e.g., the layout design 300 of FIG. 3) to be modified may have initial placement/routing information and standard cells with rails of minimum width. The rails may include a low metal layer (e.g., M2 layer) with a high resistivity characteristic. The modified layout design 400 may now include a plurality of metal fill patterns 402*a-g* that substantially overlap rail portions of the plurality of standard cells. The metal fill patterns 402*a-g* may be implemented using a low metal layer (e.g., metal layer M2) and may have a width 410 (e.g., thickness) that is larger than a minimum width of the low metal layer of the process technology. In a particular embodiment, the width 410 may be twice as large as the minimum width of the M2 layer of the process technology.

As illustrated in FIG. 4, the metal fill patterns 402*a-g* may substantially overlap the entire width of the standard cell rail portions (e.g., a width 310 of rail portions 302*b-c*, 304 *b-c*, 306 *b-c*, and 308 *b-c* of FIG. 3) and may extend away from an edge of the standard cell rail portions. For example, metal fill pattern 402*a* overlaps the rail portion (e.g., rail portion 302*b*) and extends away from the bottom edge of rail portion 302*b* to overlap an area of the standard cell (e.g., standard cell 302*a*) associated with rail portion 302*b*. The metal fill patterns 402*a-g* may substantially overlap the length of the standard cell rail portions where the length overlap is limited to those metal fill portions that satisfy one or more conditions associated with the process technology. For example, metal fill pattern 402*a* may substantially overlap the length of a rail portion (e.g., rail portion 302*b*) up to an area where the overlap does not satisfy a condition, such as a pin access condition and/or a design rule check (DRC) condition of the technology process (e.g., a DRC condition associated with access pins 302*d*, 302*e*, or both). Other conditions may include connectivity conditions, other performance conditions, or other electrical or physical conditions associated with the technology process. Similarly, metal fill pattern 402*b* may overlap the length of a rail portion(s) (e.g., rail portions 302*b*, 304*b*, and 306*b*) up to an area where the overlap does not satisfy as condition, such as a DRC condition associated with access pins 302*e*, 304*d*, 304*e*, 306*d*, or any combination thereof. In this manner, the metal fill patterns 402*a-g* represent DRC clean segments of metal fill patterns that substantially overlap rail portions associated with the plurality of standard cells.

The insertion and placement of the metal fill patterns 402*a-g* to substantially overlap rail portions of the plurality of standard cells may optimize the standard cell rails by enabling the formation of a reduced resistive path associated with the standard cell rails. For example, the rail portions 302*b-c*, 304 *b-c*, 306 *b-c*, and 308 *b-c* may have a high resistive path resulting from the minimum width 310 of the low metal layer (e.g., metal layer M2) used for the rail portions. By comparison, the metal fill patterns 402*a-g*, having a width 410 larger than the minimum width 310, may provide wider rail portions and a corresponding reduced resistive path for the standard cell rails. Standard cell rails optimized in this manner by the earlier described techniques allows for the formation of reduced resistive paths associated with standard cell rails and a corresponding reduction in dynamic and/or static voltage drops associated with the rails. Although FIG. 4 illustrates the formation of reduced resistive paths for rails using metal fill patterns 402*a-g*, having a width 410 that is twice as large as the minimum width of the M2 layer (e.g., width 310), other sizes or placements of metal fill patterns are contemplated, some of which are further described in FIG. 5.

Figure 5:
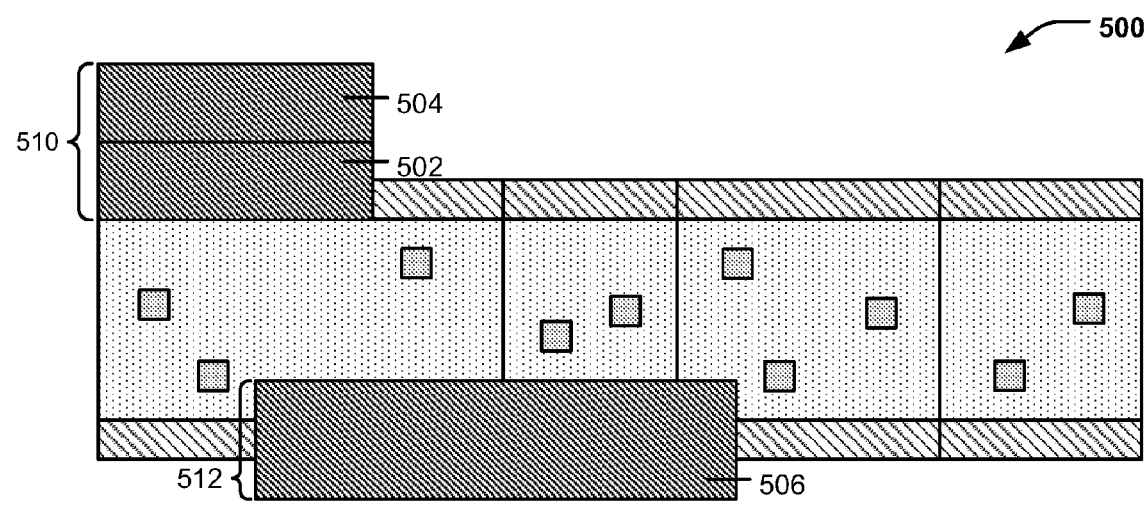
FIG. 5 illustrates another exemplary modified layout design in accordance with a particular embodiment of a method of modifying a layout of one or more standard cells defining a circuit component.

Referring to FIG. 5, another exemplary modified layout design that illustrates a particular embodiment of a method of modifying a layout of one or more standard cells defining a circuit component is shown and generally designated 500. The modified layout design 500 may be the result of modification to a layout design (e.g., the layout design 300 of FIG. 3) using the earlier described techniques. As illustrated in FIG. 5, metal fill patterns used to modify standard cell rail portions may have various widths and different placements along a rail. In an exemplary embodiment, metal fill patterns, such as the metal fill pattern 506, may have a width 512 that is three times larger than the minimum width 310 while satisfying one or more conditions associated with the process technology. In another embodiment, metal fill patterns, such as the metal fill pattern 506, may substantially overlap a rail and extend away from both a top edge and a bottom edge of the rail while satisfying one of more conditions associated with the process technology. In another embodiment, a first iteration of standard cell rail optimization may modify a layout (such as the layout 300) to provide metal fill patterns, such as the metal fill pattern 502, that may substantially overlap a rail and extend away from a top edge of the rail while satisfying one of more conditions associated with the process technology. A subsequent iteration of standard cell rail optimization may be performed to provide metal fill patterns, such as the metal fill pattern 504, that may substantially abut a previously placed metal fill pattern (e.g., the metal fill pattern 502). Metal fill patterns 502 and 504 may collectively have a width 510 that is four times larger than the minimum width 310 while both metal fill patterns satisfying one of more conditions associated with the process technology.

The metal fill patterns 502, 504, (having a collective width 510) and the metal fill pattern 506 (having a width 512) may provide wider rail portions and a corresponding reduced resistive path for the standard cell rails. It is to be understood that other subsequent iterations of standard cell rail optimization may generate metal fill patterns with widths greater than four times the minimum width 310, while satisfying one of more conditions associated with the process technology. It should also be understood that the metal fill patterns applied to standard cell rail portions, as illustrated in FIGS. 4 and 5, may also be applied to other metal portions associated with standard cells. For example, the metal fill patterns previously described may also be applied to metal straps associated with the standard cells of the layout design 300.

Figure 6:
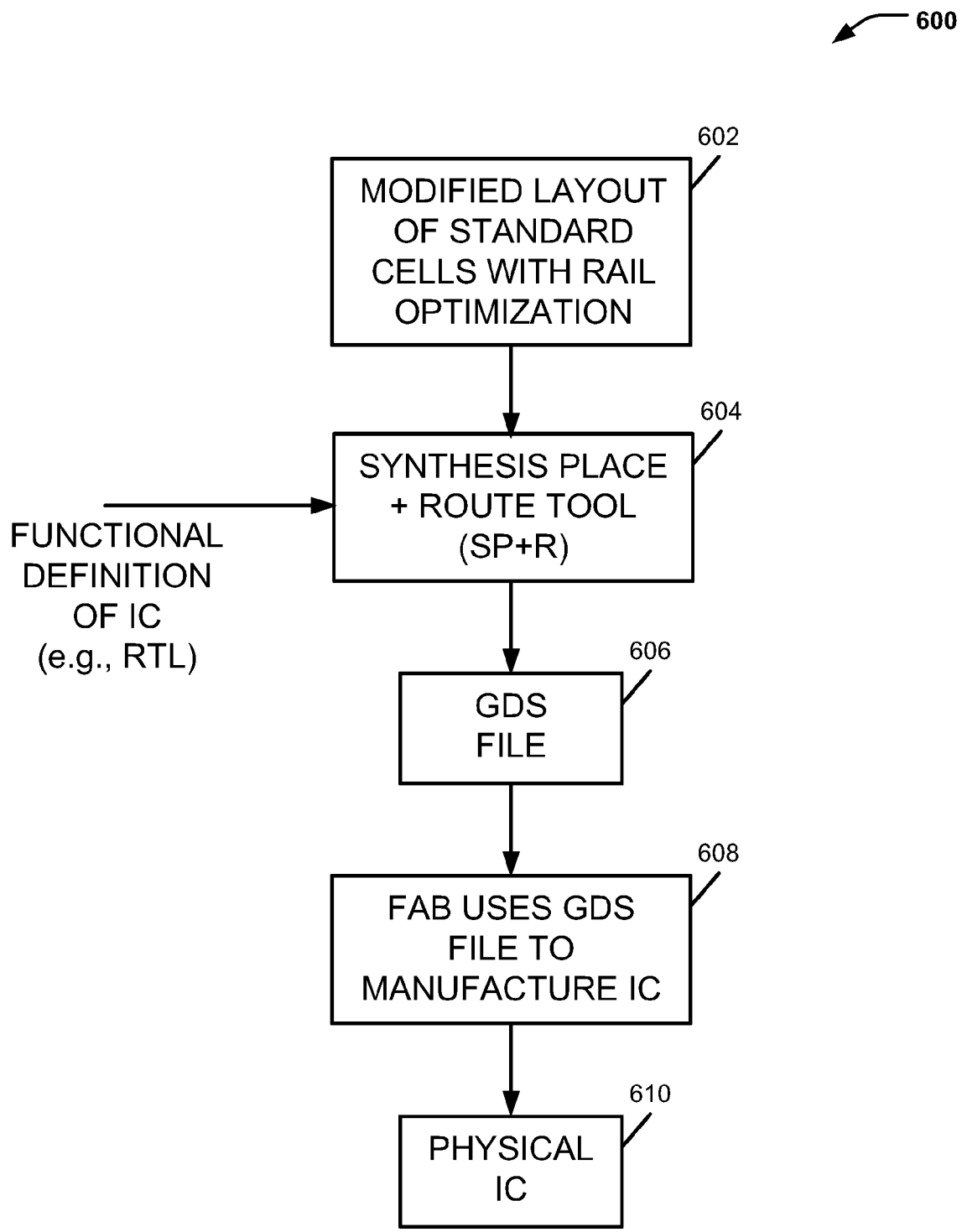
FIG. 6 schematically illustrates how an integrated circuit is manufactured in one embodiment, using the modified layout design generated using the techniques described herein.

Referring to FIG. 6, a flow diagram illustrating the steps involved in one embodiment in order to manufacture a physical integrated circuit from the standard cells having modified rails (e.g., power and/or ground rails) using the earlier described techniques is shown and generally designated 600. In particular, a modified layout with optimized rails 602 may be provided containing a plurality of standard cells having one or more modified rails generated using the above described techniques.

A synthesis place and route (SP&R) tool 604 may then receive a functional definition of the desired integrated circuit, for example in RTL (Register Transfer Language) form, and using the modified layout with optimized rails 602 can then generate an output GDS file 606 representing the integrated circuit layout in each of the various layers. GDS is a well known file format for representing layout.

At step 608 the manufacturing facility (also referred to as the fab) uses the GDS file in order to manufacture the integrated circuit, for example by depositing various layers on a semiconductor substrate in patterns defined by the GDS file. This results in the output of a physical integrated circuit having standard cells with optimized rails at step 610.

Figure 7:
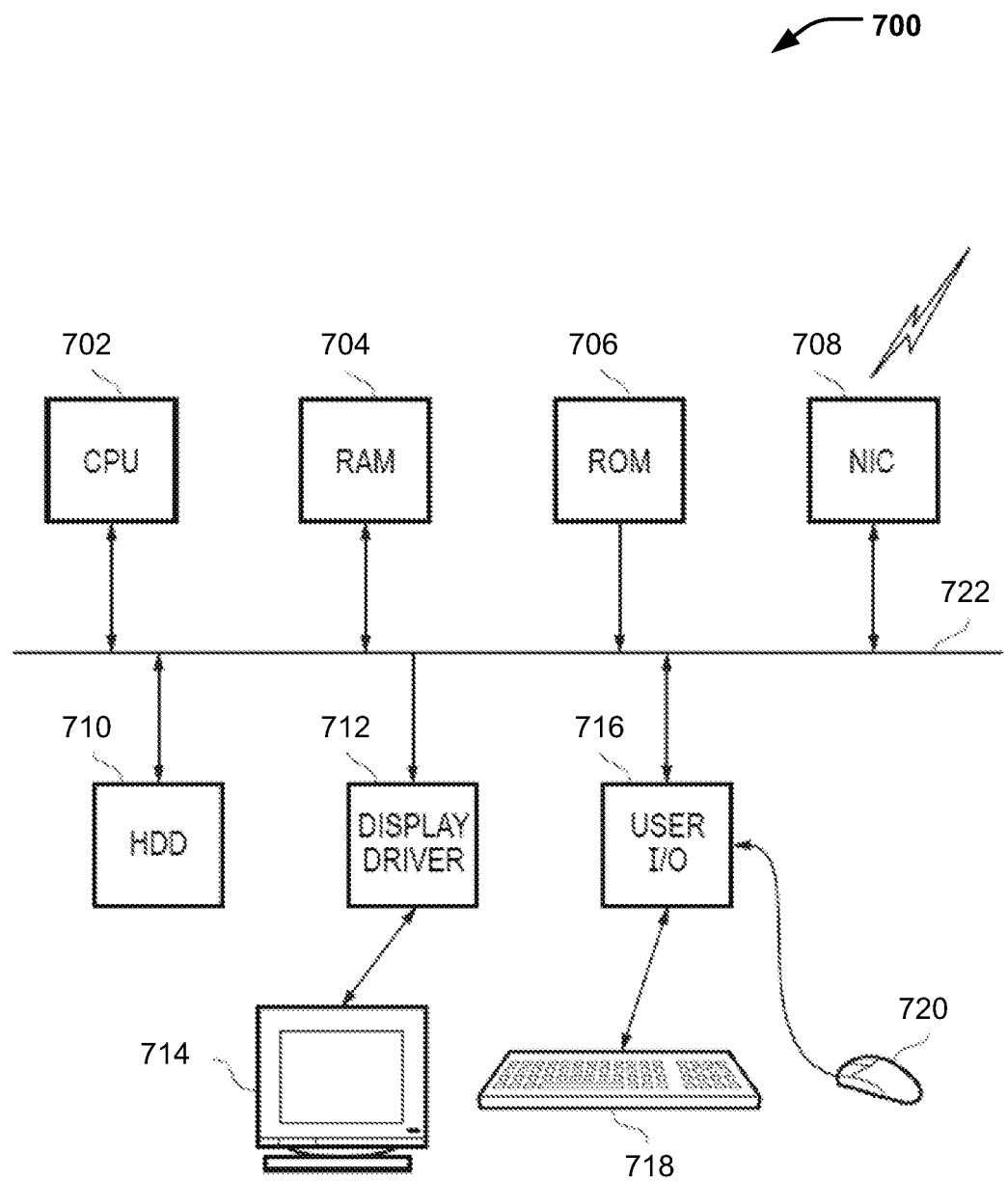
FIG. 7 schematically illustrates a general purpose computer of the type which can be used to implement the present techniques described herein.

Referring to FIG. 7, a block diagram schematically illustrating a general purpose computer of the type that may be used to implement the above described techniques is shown and generally designated 700. The general purpose computer 700 includes a central processing unit 702, a random access memory 704, a read-only memory 706, a network interface card 708, a hard disk drive 710, a display driver 712 and monitor 714, and a user input/output circuit 716 with a keyboard 718 and mouse 720 all connected via a common bus 722. In operation the central processing unit 702 will execute computer program instructions that may be stored in one or more of the random access memory 704, the read-only memory 706 and the hard disk drive 710, or dynamically downloaded via the network interface card 708. The results of the processing performed may be displayed to a user via the display driver 712 and the monitor 714. User inputs for controlling the operation of the general purpose computer 700 may be received via the user input/output circuit 716 from the keyboard 718 or the mouse 720. It will be appreciated that the computer program could be written in a variety of different computer languages. The computer program may be stored and distributed on a recording medium or dynamically downloaded to the general purpose computer 700. When operating under control of an appropriate computer program, the general purpose computer 700 can perform the above described techniques and can be considered to form an apparatus for performing the above described techniques. The architecture of the general purpose computer 700 could vary considerably, and FIG. 7 is only one example.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A computer implemented method comprising:
   receiving, after completion of one or more initial place and route operations, an input data file that includes a layout of one or more standard cells for a process technology, wherein the layout includes placement and routing information generated by the one or more initial place and route operations;
   identifying one or more metal portions in the one or more standard cells, the one or more metal portions associated with one or more rails of the one or more standard cells of the layout;
   performing a metal fill operation on the input data file in order to generate a modified input data file, wherein the metal fill operation includes modifying the one or more metal portions with one or more metal fill patterns to form a reduced resistive path associated with the one or more metal portions;
   modifying the layout of the one or more standard cells utilizing the modified input data file;
   generating, from an input functional definition of an integrated circuit, a layout design incorporating the modified layout of the one or more standard cells; and
   manufacturing the integrated circuit from the layout design.

2. The method of claim 1, wherein the metal portions include rail portions, strap portions, or both.

3. The method of claim 1, wherein the one or more metal fill patterns are metal-2 layer patterns.

4. The method of claim 1, wherein the layout is associated with a system on a chip (SoC).

5. The method of claim 1, wherein the process technology is associated with a double patterning technique.

6. The method of claim 1, wherein a process size of the process technology is less than or equal to 16 nm.

7. The method of claim 1, wherein the process technology is associated with nonplanar multi-gate devices.

8. The method of claim 1, wherein the one or more rails includes a power rail, a ground rail, or both.

9. The method of claim 1, wherein the one or more standard cells include power switching cells.

10. The method of claim 1, wherein modifying the one or more metal portions includes:
    adding the one or more metal fill patterns to the layout, wherein the added one or more metal fill patterns substantially contact the one or more metal portions; and
    removing the added one or more metal fill patterns that do not satisfy one or more conditions associated with the process technology.

11. The method of claim 10, wherein adding the one or more metal fill patterns further includes placing the one or more metal fill patterns along the entire length of the one or more metal portions.

12. The method of claim 11, wherein the added one or more metal fill patterns have a minimum width of the process technology.

13. The method of claim 10, wherein the one or more conditions include one or more design rule check (DRC) conditions, one or more pin access conditions, or both.

14. The method of claim 10, wherein the contact provides a substantial electrical connection between the added one or more metal fill patterns and the one or more metal portions.

15. The method of claim 1, further comprising performing one or more place and route operations and one or more metal correction operations on the modified input data file in order to form an output data file providing a layout pattern of the one or more modified metal portions.

16. The method of claim 1, further comprising merging a layout pattern of the one or more modified metal portions into drawn metal associated with the process technology.

17. The method of claim 16, wherein the drawn metal is logically connected to one or more power supply networks associated with the layout.

18. A computer program product on a non-transitory storage medium for controlling a computer to perform the method of claim 1.

19. A system, comprising:
    means for receiving, after completion of one or more initial place and route operations, an input data file that includes a layout of one or more standard cells for a process technology, wherein the layout includes placement and routing information generated by the one or more initial place and route operations;
    means for identifying one or more metal portions in the one or more standard cells, the one or more metal portions associated with one or more rails of the one or more standard cells of the layout;
    means for performing a metal fill operation on the input data file in order to generate a modified input data file, wherein the metal fill operation includes modifying the one or more metal portions with one or more metal fill patterns to form a reduced resistive path associated with the one or more metal portions;

means for modifying the layout of the one or more standard cells utilizing the modified input data file;

means for generating, from an input functional definition of an integrated circuit, a layout design incorporating the modified layout of the one or more standard cells; and manufacturing the integrated circuit from the layout design.

\* \* \* \* \*